United States Patent [19]
Gondard et al.

[11] Patent Number: 5,244,982
[45] Date of Patent: Sep. 14, 1993

[54] (CO)POLYMER CROSS LINKING PROCESS, CROSS-LINKED COMPOSITIONS, USES AND SHAPED OBJECTS

[75] Inventors: Christian Gondard, Roanne; Alain Michel, Lyon, both of France

[73] Assignees: Centre National De La Recherche Scientifique, Paris; Sotra Industries, Andresy, both of France

[21] Appl. No.: 773,886

[22] PCT Filed: Dec. 28, 1990

[86] PCT No.: FR90/00966

§ 371 Date: Oct. 28, 1991

§ 102(e) Date: Oct. 28, 1991

[87] PCT Pub. No.: WO91/09899

PCT Pub. Date: Jul. 11, 1991

[30] Foreign Application Priority Data

Dec. 28, 1989 [FR] France .................. 89 17358

[51] Int. Cl.$^5$ .................................. C08F 8/00
[52] U.S. Cl. ........................ 525/360; 525/327.8; 525/330.2; 525/330.6; 525/330.9; 525/332.5; 525/364; 525/370
[58] Field of Search ............ 525/364, 370, 330.2, 525/330.6, 332.5, 327.8, 330.9, 360

[56] References Cited

U.S. PATENT DOCUMENTS

| | | | |
|---|---|---|---|
| 3,767,615 | 10/1973 | Throckmorton et al. | 524/82 |
| 4,012,567 | 3/1977 | Loveless | 525/330.9 |
| 4,497,937 | 2/1985 | van der Klooster et al. | 525/370 |
| 4,789,696 | 12/1988 | Paar et al. | 524/495 |
| 4,892,683 | 1/1990 | Naseem | 523/200 |

FOREIGN PATENT DOCUMENTS 261486 3/1988 European Pat. Off. .
692554 6/1953 United Kingdom .
907775 10/1962 United Kingdom .

OTHER PUBLICATIONS

A. H. Frye, R. W. Horst, and M. A. Paliogabis *J. of polym. Sci.* A2, 1765 (1964); id.p.1785; id.p. 1801.
A. Michel, A. Guyot and D. Nolle *Polymer Degrad. and Stab.* 2, 277 (1980).
C. Mijangos, G. Martinez, A. Michel, J. Millan and A. Guyot *Eur. Polym. J.* 20(1), 1 (1984).
K. Mori, Y. Nakamura, and T. Hayakari *die Angewandte Makromol. Chem.* 66, 169 (1978).
M. Gonnu and A. Michel *Makromol. Chom., Makromol. Symp.*, 25, 219 (1989).
J. C. Pommier, J. Valade and M Delepine *C.R Acad. Sc. Paris* 260, 4549 (1965).
J. C. Pommier and J. Valade *J. of Organometallic Chem.* 12, 433 (1968).

*Primary Examiner*—Paul R. Michl
*Assistant Examiner*—Tae H. Yoon
*Attorney, Agent, or Firm*—Browdy and Neimark

[57] ABSTRACT

Method for crosslinking (co)polymers comprising chlorine, ester, NH or carbonate groupings, according to which said (co)polymer is reacted at between 100° and 300° C., and without the presence of a solvent, with a tin-, lead-, bismuth- or antimony-based organometallic alcoholate. Mixtures, crosslinkable compositions and shaped objects are also described.

27 Claims, No Drawings

(CO)POLYMER CROSS LINKING PROCESS, CROSS-LINKED COMPOSITIONS, USES AND SHAPED OBJECTS

The present invention relates to a polymer or copolymer cross-linking process, cross-linkable compositions and their use, notably for preparing shaped objects and the shaped objects thus obtained.

The cross-linking of a polymer creates a three-dimensional network, the consequence of which is to increase the molecular weight. The cross-linking bridges form intermolecular bonds which then limit the movements of the polymer chains in relation to each other and consequently greatly limit the flow behaviour of these chains. Therefore the significant consequence of the cross-linking of a thermoplastic polymer is to raise its thermoplasticity threshold to high temperatures and to improve its resistance to plastic flow over a wider temperature range and therefore to obtain greater dimensional stability of the shaped objects.

Several processes have been proposed for cross-linking thermoplastics such as polyvinyl chloride and polyolefin polychloride. They are either based on radical-like reactions, or on nucleophilic condensation or substitution reactions. For example, with regard to polyvinyl chloride, an attempt was made to cross-link it by photochemical route, by electron bombardment and by gamma irradiation by subjecting the polymer to these radiations in the presence of a multi-functional monomer such as for example tetraethyleneglycol dimethacrylate or trimethylolpropane trimethacrylate, the cross-linking reaction being provided by grafting and polymerization of these multi-functional monomers onto the polymer skeleton. The main disadvantage of these processes for polyvinyl chloride is its sensitivity to these rays which bring about its degradation by elimination of the HCl in a cascade process. Moreover, the cross-linking mechanism is difficult to control because the polymerization and grafting of the functional monomers onto the polymer network bring about transfer reactions.

Furthermore, in order to obtain homogeneous and effective cross-linking, the quantities of multi-functional monomer must be quite high, the consequence of which is to modify the intrinsic properties of the cross-linked polyvinyl chloride. Finally, the processes using gamma rays or electron bombardment require a high level of technology and costly equipment.

In order to overcome these disadvantages, processes were proposed based on radical-like grafting of functionalized monomers initiated by peroxides. These functionalized monomers can contain for example alkoxysilane groups which lead via hydrolysis and polycondensation to silanol groups and to cross-linking It is thus that the process known by the process name SIOPLAST by Dow Chemicals was developed for polyethylene cross-linking, in particular for applications relating to cable manufacturing. However, this process has the disadvantage of causing a cross-linking density gradient because the cross-linking is governed by the diffusion of water in the finished object, which water is required for the hydrolysis reaction of the alkoxysilane functions.

For polyvinyl chloride, processes were proposed which bring about a nucleophilic substitution reaction of the chlorine atoms by alkaline or alkaline-earth thiolates or mixed alkaline or alkaline-earth thiolate-carboxylate compounds. These processes are well adapted mainly for implementation by coating but they are less well adapted for extrusion or calendering processes. Their main disadvantage resides, however, in the fact that they make the cross-linked materials very sensitive to photochemical degradation caused by by-products such as disulphides. For this reason, the development of these processes has not become widespread.

European Patent No. 0,032,587 proposes the cross-linking of acrylic ester copolymers by diols or monoesters or diesters in the presence of titanates of general formula $Ti(OR)_4$. These four (OR) groups can be identical or different. Moreover, this process only applies to alkene and alkyl acrylate copolymers and does not apply to halogenated polymers such as polyvinyl chloride, nor to polymers with NH functions such as polyamides.

British Patent No. 907,775 describes a process for the treatment of polyvinyl acetate by a metal alcoholate of formula $M(OR)_n$, M being able to be in particular titanium or tin: the reaction is carried out at 80° C. in a solvent and leads to a substitution of the acetate radicals by titanate or stannate radicals leading to the formation of an organometallic polymer.

Therefore a polymer or copolymer cross-linking process is still being sought, which is simple, inexpensive and is implemented without the presence of a solvent and by simple heating, in such a way as to be compatible with the standard processes for forming polymers such as extrusion, injection, calendering, coating, moulding and thermoforming.

This is why a subject of the present invention is a cross-linking process for polymers or copolymers, polymer or copolymer mixtures containing chlorinated groups and/or esters and/or amides and/or polycarbonates which can be integrated with industrial working operations such as extrusion, calendering, coating, injection or moulding.

A more particular subject of the present Application is a cross-linking process for polymers or copolymers containing chloro, ester, NH or carbonate groups, characterized in that a cross-linking agent of organometallic alcoholate type of formula $(R)_n Me(O)_{m-n} R'$, in which:

Me represents a tin, lead, bismuth or antimony atom, Me preferably represents tin, R represents a linear or branched alkyl radical containing 1 to 8 carbon atoms, a cycloalkyl radical containing 3 to 12 carbon atoms, an optionally substituted aryl radical containing 6 to 14 carbon atoms, an optionally substituted aralkyl radical containing 7 to 14 carbon atoms or a cycloalkylalkyl radical containing 4 to 8 carbon atoms, R' represents a linear or branched alkyl radical containing 1 to 20 carbon atoms, an aralkyl radical containing 8 to 15 carbon atoms, a cycloalkyl radical containing 3 to 12 carbon atoms, an arylcycloalkyl radical containing 10 to 20 carbon atoms or a polymer chain, m is equal to 4 and n is equal to 1, 2 or 3, when Me represents tin or lead, and m is equal to 5 and n is equal to 1, 2, 3 or 4, when Me represents bismuth or antimony, is reacted with the said (co)polymer between 100° and 300° C. and in the absence of solvents.

The linear or branched alkyl radicals containing 1 to 20 carbon atoms, aralkyl radicals containing 8 to 15 carbon atoms, cycloalkyl radicals containing 3 to 12 carbon atoms, arylcycloalkyl radicals containing 10 to 20 carbon atoms or the polymer chain can be optionally functionalized, that is to say substituted by a function such as ether or thioether, hydroxy, which is not capable of destroying the reagents used.

The linear or branched alkyl radical preferably designates a methyl, n-butyl or n-octyl radical with regard to R, a methyl, ethyl, ethylene, propyl or propylene with regard to R'.

The expression "cycloalkyl radical containing 3 to 6 carbon atoms" preferably designates a cyclopropyl or cyclobutyl radical.

The expression "aryl radical containing 6 to 12 carbon atoms" preferably designates a phenyl radical.

The expression "aralkyl radical containing 7 to 14 carbon atoms" preferably designates a benzyl or phenethyl radical.

The expression "cycloalkylalkyl radical containing 4 to 8 carbon atoms" preferably designates a cyclopropylmethyl radical.

When an aryl is substituted, it is preferably substituted by an ethyl, methyl, methoxy or chlorine radical.

When n=1, 2, 3 or 4, as a function of the type of metal, according to the present invention, the metallic alcoholate derives:

either from a monoalcohol and is of polyalkoxymetal type and advantageously dialkoxymetal, and the oxygen atoms linked to the metal atom are not linked to each other by a hydrocarbonated radical or one of another nature;

or from a polyol, advantageously a diol, and it is then of cyclic type, at least two oxygen atoms linked to the metal atom being connected by a hydrocarbonated remainder according to the general formulae:

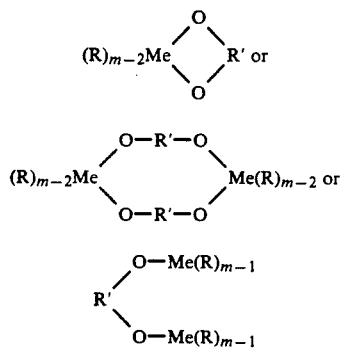

in which R, R', Me and m having the meanings already indicated.

By tin, lead, antimony or bismuth organometallic alcoholate is meant that the metal atom is linked to a carbon atom of the R radical by a covalent bond; in some cases, the R radical can be common to several metallic atoms. The R and R' radicals can be, according to the invention, identical or different.

According to the present invention, the polymer or copolymer families as well as their mixtures cross-linkable by tin, lead, antimony or bismuth organometallic alcoholates are:

chlorinated polymers and chlorinated copolymers such as for example and in a non-limitative way polyvinyl chloride, polyvinylidene chloride, polychloroprene, chlorinated polyethylenes, chlorinated rubbers;

polyacid polyesters;

polymers and copolymers of acrylic and methacrylic esters such as polyacrylates and methacrylates of methyl, ethyl, butyl and ethyl-2-hexyl, copolymers of acrylic or methacrylic esters with vinyl chloride and ethylene and polypropylene ethyl, butyl or ethyl-2-hexyl acrylate grafted copolymers;

polyol esters;

vinyl acetate polymers and copolymers such as for example and in a non-limitative way vinyl chloride vinyl acetate copolymers, ethylene - vinyl acetate copolymers, polypropylene - vinyl acetate grafted copolymers;

polymers and copolymers containing NH functions, notably polyamides and copolyamides, polyacrylamides and copolymers based on acrylamide, polyurethanes, polyureas;

polyesters such as polyethylene terephthalate or polybutylene terephthalate;

polycarbonates;

According to the present invention, in order to bring about the cross-linking of chlorinated (co)polymers, the said chlorinated (co)polymer can be reacted directly with an acyclic-type organometallic alcoholate such as the type: R'(O—Me—R)$_2$, R, R' and Me having the meaning already indicated, or of cyclic (oxycycloalkyl) metal type. In the latter case, an alcoholate is preferably used containing two oxygen atoms linked to the metal atom and connected to each other by an R' hydrocarbonated group carried by the polyol, of general formula:

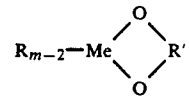

in which R, R', Me and m having the meaning already indicated.

According to the invention, and advantageously, an organometallic alcoholate derivative of ethyleneglycol is used as polyol; in this case, R'=(CH$_2$)$_2$.

According to the invention, the organometallic alcoholate can be in polymer form, preferably dimer, noncyclized or cyclized, and in this case can have as formula type with ethyleneglycol:

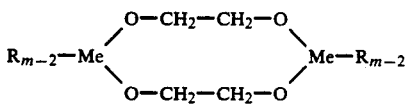

in which R and m have the meaning already indicated.

According to the invention, when the organometallic alcoholate derives from ethyleneglycol or from a higher diol, and according to the valency value of the Me metal, one or two of the R radicals can be linked to the Me atom by means of an oxygen atom.

The organometallic alcoholate can also, according to the present invention, be formed in situ by mixing, before forming, the chlorinated (co)polymer, the organometallic oxide and the polyol ester, such as for example ethyleneglycol carbonate or trimethylolpropane triacetate. The organometallic oxide could be for example of R$_2$MeO type, when Me=Sn or Pb and of R$_3$MeO type when Me=Sb or Bi.

The organometallic alcoholate can also, according to the present invention, be prepared in situ by mixing, before the forming phase, the chlorinated (co)polymer, an organometallic halide, preferably a chloride and a polyol alkaline or alkaline-earth alcoholate, advantageously ethyleneglycol. The organometallic halide could be for example of $R_2MeCl_2$ type when $Me=Sn$ or Pb and of $R_3MeCl_{12}$ type when $Me=Sb$ or Bi, R having the previously-defined meaning.

The alkaline-earth alcoholate will preferably be a calcium or barium alcoholate.

According to the present invention, in order to bring about the cross-linking of (co)polymers of acrylic and methacrylic esters, of polyacid polyesters, of (co)-polymers of vinyl acetate, of polyol polyesters, of (co)-polyamides, of polyacrylamide and copolymers of acrylamide or of any (co)polymer containing NH groups, these (co)polymers can be reacted either as previously, or with an organometallic alcoholate of cyclic (oxacycloalkyl, oxacycloalkylaryl) type, or with an organometallic alcoholate of polyalkoxymetal type deriving from a monoalcohol and advantageously of dialkoxymetal type of general formula:

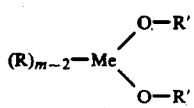

in which R, R', Me and m have the meaning already indicated.

According to the present invention, in order to bring about the cross-linking of (co)polymers containing ester functions, the cross-linking agent of organometallic alcoholate nature can be prepared in situ before forming. In the case where the (co)polymers containing ester functions derive from a polyol or are more particularly vinyl acetate (co)polymers, an organometallic oxide will be reacted with these (co)polymers in the presence of a polyacid polyester and advantageously in the presence of a diester of an alpha-w-diacid such as, in a non-limitative way, dimethyl or diethyl phthalate, dimethyl adipate, dimethyl sebacate.

Also according to the invention, in the case where the (co)polymers containing ester functions derive from a polyacid and are more particularly, as a non-limitative example, acrylic ester (co)polymers, these (co)polymers are reacted with an organometallic oxide in the presence of a polyol polyester and advantageously in the presence of an alpha-w-diol ester such as ethyleneglycol or in the presence of a trimethylolpropane triester such as for example trimethylolpropane triacetate or a polyester derivative of pentaerythritol.

The cross-linking of (co)polymers of vinyl acetate and more generally of polyols is brought about using at least one alcoholate formed by the interaction of the acetate functions with an organometallic oxide, for example of formula $R_2MeO$, if $Me=Sn$ or Pb or $R_3MeO$, if $Me=Sb$ or Bi.

According to the present invention, the (co)polymers containing NH functions such as polyamides, copolyamides, polyacrylamides, polyurethanes or polyureas can also be cross-linked by tin, lead, antimony and bismuth organometallic alcoholates, by dialkoxymetals deriving either from a monoalcohol of general formula R'OH or from a polyol, for example a diol of general formula OHR'OH, R' having the meaning already indicated, the organometallic alcoholate being previously synthesized before being mixed with the polymer or synthesized in situ.

According to the present invention, the tin, lead, antimony and bismuth organometallic alcoholates enable the co-cross-linking of (co)polymer mixtures containing chlorine atoms, ester groups, NH functions such as amides or urethanes and carbonate functions to be carried out. By way of example and in a non-limitative fashion, there can be mentioned:

co-cross linking of polyvinyl chloride and vinyl acetate copolymers such as for example vinyl chloride - vinyl acetate copolymers or ethylene - vinyl acetate copolymers. In this case, and advantageously, the organometallic alcoholate is synthesized in situ by mixing polyvinyl chloride and vinyl acetate copolymers with an organometallic oxide of tin, lead, antimony or bismuth;

co-cross linking of copolymers of vinyl chloride and vinyl acetate and copolymers of vinyl chloride and ethyl acrylate. In this case, and advantageously, the co-crosslinking is carried out by mixing an organometallic oxide of tin, lead, antimony or bismuth with the copolymers;

co-cross-linking of copolymers of ethylene and vinyl acetate and of copolymers of ethylene and ethyl or butyl acrylate. In this case, and as previously, the co-crosslinking is advantageously carried out by adding an organometallic oxide to the copolymers;

co-cross-linking of grafted copolymers of polypropylene with vinyl acetate and butyl acrylate. Also in this case, and as previously, the co-cross-linking is obtained advantageously by mixing an organometallic oxide with the copolymers;

co-cross-linking of grafted polypropylene butyl acrylate copolymers and ethylene - vinyl acetate copolymers can be carried out by tin, lead, antimony and bismuth organometallic alcoholates by generation in situ of these alcoholates by mixing an organometallic oxide of these metals with these copolymers;

co-cross-linking of polyamides and copolymers of ethylene and vinyl acetate or ethylene and acrylic esters, such as for example ethyl acrylate, can be carried out by organometallic alcoholates of tin, lead, antimony or bismuth metals, the alcoholate being synthesized in situ during the forming stage. As examples for the co-cross-linking of polyamides and copolymers of vinyl acetate, an organometallic alcoholate will be used deriving from a monoalcohol such as for example methanol or ethanol and of general formula:

$$R_{m-2} Me(OR')_2$$

in which R, R', Me and m have the meaning already indicated, and for the co-cross-linking of a polyamide with a copolymer of ethylene and an acrylic ester, an organometallic alcoholate will be used deriving from a diol synthesized in situ by adding for example to the mixture of ethyleneglycol polymers an organometallic oxide of general formula $R_{m-2}$ Me—O with R, Me and m defined as previously.

According to the present invention, and advantageously, the molar quantities of the organometallic alcoholates of tin, lead, antimony or bismuth used vary as a function of the cross-linking density desired, taking account of the applications, and they are preferably situated in the concentration range of $10^{-2}-5.10^{-1}$ mole per kg of polymer. At concentrations higher than $5.10^{-1}$ mole per kg of polymer, the consequence of the cross-linking densities obtained can be to weaken the material, this disadvantage being more or less marked as a function of the applications and can be reduced by judicious choices of formulations.

The process thus described allows cross-linking or preferably co-cross-linking, and in the industrial working conditions such as extrusion, calendering, injection, coating or moulding:

chlorinated polymers and particularly the homopolymer polyvinyl chloride and its copolymers, notably vinyl acetate and acrylic esters;

copolymers of ethylene and vinyl acetate or acrylic esters;

polyamides;

polycarbonates;

grafted copolymers of polypropylene - vinyl acetate or acrylic esters. In this particular case, the present invention appears as an original way for cross linking polypropylene;

mixtures of polyvinyl chloride and grafted copolymers of polypropylene - vinyl acetate or acrylic esters;

mixtures of polyvinyl chloride and polyamide;

mixtures of polyamides and copolymers of ethylene vinyl acetate or ethylene - acrylic esters;

mixtures of polyamides and chlorinated polyethylene;

mixtures of grafted copolymers of polypropylene vinyl acetate and copolymers of ethylene - acrylic esters;

mixtures of grafted copolymers of polypropylene acrylic esters and copolymers of ethylene - vinyl acetate.

Also a subject of the invention is cross-linkable compositions which can be made use of by the process according to the present invention.

Also this is why a more particular subject of the present Application is cross-linkable compositions, characterized in that they include a (co)polymer containing chloro, ester, NH or carbonate groups, and a derivative of organometallic alcoholate type of formula $(R)_n Me(O)_{m-n} R'$, in which:

Me represents a tin, lead, bismuth or antimony atom,

R represents a linear or branched alkyl radical containing 1 to 8 carbon atoms, a cycloalkyl radical containing 3 to 12 carbon atoms, an optionally substituted aryl radical containing 6 to 14 carbon atoms, an optionally substituted aralkyl radical containing 7 to 14 carbon atoms or a cycloalkylalkyl radical containing 4 to 8 carbon atoms, R' represents a linear or branched alkyl radical containing 1 to 20 carbon atoms, an aralkyl radical containing 8 to 15 carbon atoms, a cycloalkyl radical containing 3 to 12 carbon atoms, an arylcycloalkyl radical containing 10 to 20 carbon atoms or a polymer chain, optionally functionalized, m is equal to 4 and n is equal to 1, 2 or 3, when Me represents tin or lead, and m is equal to 5 and n is equal to 1, 2, 3 or 4, when Me represents bismuth or antimony.

A subject of the present invention is in particular cross-linkable compositions, characterized in that they contain a chlorinated (co)polymer;

those which contain a (co)polymer of acrylic ester or methacrylic ester;

those which contain a (co)polymer of vinyl acetate;

those which contain a (co)polymer containing NH functions;

those which contain a polycarbonate;

those which contain a polyester;

those which contain a (co)polymer of polyvinyl chloride;

those which contain a copolymer of ethylene vinyl acetate;

those which contain a chlorinated or grafted polypropylene vinyl acetate and/or acrylic or methacrylic ester;

and those which contain a polyamide.

Also a subject of the present Application is cross-linkable compositions, characterized in that they include a chlorinated (co)polymer, an organometallic halide of tin, lead, antimony or bismuth and a polyol alkaline or alkaline-earth alcoholate, and also those which include a chlorinated (co)polymer, an organometallic oxide of tin, lead, antimony or bismuth and a polyol or polyol ester; as well as those which include a chlorinated (co)polymer, an organometallic oxide of tin, antimony, lead or bismuth and a (co)polymer whose chain contains hydroxyl and/or ester functions such as for example vinyl acetate units or acrylic or methacrylic ester units.

Finally a subject of the present Application is in particular cross-linkable compositions, characterized in that they include a (co)polymer of vinyl acetate or a polyol ester and an alcoholate of tin, lead, antimony or bismuth, this alcoholate being able to be cyclic or non-cyclic according to the definition of the present invention and including at least two alkoxy functions; those characterized in that they include a polymer or (co)polymer of acrylic or methacrylic esters or polyacid esters and an organometallic alcoholate of tin, lead, antimony or bismuth obtained by reacting an organometallic oxide of tin, lead, antimony or bismuth with a polyol; and those characterized in that they include a (co)polymer of vinyl acetate and/or a polyol ester, a (co)polymer of acrylic or methacrylic esters and/or a polyacid ester, and an organometallic oxide of tin, antimony, lead or bismuth.

The various constituents of these compositions have already been described in more detail above. When it is said that a composition includes a certain product, what is meant by this is that it contains at least one product of this type, for example at least one chlorinated polymer.

The compositions according to the invention can moreover contain adjuvants normally used in the plastic materials industry, fillers, plasticizers, anti-oxidants, stabilizers, pigments, lubricants, etc. These constituents can be added at the start of the process during the mixing stage of the cross-linkable products.

Among the fillers, there can be mentioned for example calcium carbonates, talc or titanium oxide.

Among the plasticizers, there can be mentioned for example phthalates such as di(ethyl-2-hexyl) phthalate.

As stabilizers, there can be mentioned for example metallic soaps, notably of lead, calcium or tin.

Among the pigments, there can be mentioned for example carbon black, titanium oxide or cobalt blue.

Among the lubricants, there can be mentioned for example stearic acid derivatives such as magnesium stearate or non-chlorinated paraffins.

According to an advantage of the present invention, the cross-linking temperature can be adapted as a function of the process for making use of the compositions of this invention in such a way that the cross-linking is not too advanced in the forming phase of standard processes such as extrusion, calendering, injection, coating and moulding, the cross-linking being terminated after the forming phase, for example in a cooling jig or inside a mould in the case of injection, by adjusting the time and temperature parameters.

Another advantage according to the invention is the control and adaptation of the cross-linking density as a function of the desired properties by controlling the duration of the reaction, the concentration of the reactive types of the cross-linkable composition, notably the concentration of organometallic alcoholate and of the composition of (co)polymers used based on vinyl acetate or acrylic or methacrylic esters.

According to the invention, the properties of plastic flow behaviour and dimensional stability of shaped polymer objects will be decidedly improved after cross-linking.

According to the invention, the co-cross-linking of chlorinated (co)polymer mixtures with polyamides is also a means of stabilizing these mixtures with regard to segregation phenomena.

This is why a subject of the present Application is also alloy mixtures or mixed compositions of the (co)-polymer families mentioned above.

There can be mentioned for example mixtures of chlorinated (co)polymers with ethylene vinyl acetate copolymers and mixtures of polyamide with ethylene vinyl acetate or ethylene - acrylic ester (co)polymers.

Finally the present Application relates to shaped objects, characterized in that they are prepared starting from products obtained by the implementation of the above described process, and also shaped objects constituted by a composition as defined above.

The examples which follow illustrate the invention without however limiting it.

The cross-linking of polymers, copolymers, mixtures of polymers and/or copolymers and cross-linkable compositions according to the invention is characterized either using a Haake plastograph in dynam phase, provided with an internal mixer of 60 ml capacity, RHEOMIX 600 type. This apparatus allows the continuous monitoring of the load moment exerted by the polymer on the blades of the mixer. The cross-linking of the polymer causes an increase in the viscosity in the molten state and consequently an increase in the moment observed after thickening or melting of the polymer. The variation in the moment M between the moment reached after thickening or melting (Mmin) and the maximum moment (Mmax) reached at the end of the experiment is a criterion of crosslinking.

Two other criteria have been used to evaluate the reaction kinetics in dynamic phase: the time Ti at the end of which an increase in the load moment is produced, characteristic of a significant cross-linking, and the speed of increase in moment between the maximum value (Mmax) and the minimum value (Mmin) comparable to the average cross-linking speed.

Another criterion characterizing the degree of cross-linking of a polymer is the percentage of insoluble polymer in one of its solvents, for example tetrahydrofuran (THF) for polyvinyl chloride and its copolymers and xylene at 140° C. for copolymers of ethylene and polypropylene.

The cross-linking of polymers, copolymers and mixtures of polymers or copolymers and compositions according to the invention has also been characterized under static conditions using a press after thickening or melting in the internal RHEOMIX 600 mixer fitted to the Haake plastograph in order to obtain a good homogenization of the reagents and (co)polymers. This first phase being completed, the thickened or molten material is transferred to a 3 mm-thick rectangular mould itself placed between the plates of a hot press.

After a curing time at a given temperature, generally 5 minutes, the moulded plate is cooled rapidly. The degree of cross-linking in these conditions is evaluated by the proportion of insoluble polymer in one of its solvents and/or by the swelling rate of this solvent, defined by the relationship:

$$G = \frac{(Mg - Mf/\rho s + Mp/\rho P)}{Mp/\rho P}$$

Mg being the mass of swollen sample, Mp the mass of insoluble 30 polymer, $\rho S$ and $\rho P$ being the respective volumetric masses of the solvent and the polymer. For THF $\rho s = 0.948$ g/cm$^3$ and for polyvinyl chloride $\rho p = 1.38$ g/cm$^3$. For all the examples described, the organometallic alcoholates of tin, lead, antimony or bismuth are synthesized before their introduction into the polymer or conversely in situ.

When they are synthesized beforehand, generally a monoalcohol or a polyol is reacted with an organometallic oxide. On the other hand, when they are synthesized in situ:

either an organometallic oxide of tin, lead, antimony or bismuth can be reacted with a monoalcohol or a polyol as previously but within the polymer matrix;

or an organometallic halide of tin, lead, antimony or bismuth can be reacted with a monoalcohol or polyol alkaline or alkaline-earth alcoholate;

or an organometallic oxide of tin, lead, antimony or bismuth can be reacted with a polyol ester of polymer nature or not. When the polyol ester is a polymer, the alcoholate is itself of polymer nature.

Table I sets out the various examples relating to the cross-linking of polyvinyl chloride by organometallic alcoholates of tin and of lead according to the invention, these being synthesized before their use or in situ in the polymer matrix during the forming operations of the material. The tests described in this table were carried out in a RHEOMIX 600 internal mixer fitted to a Haake plastograph, the rotational speed being 50 revs per minute. The stabilizers used are either isooctyl dioctyltin dithioglycolate, called tin stabilizer, at a rate of 2 g per 100 g of polymer, or a mixture of cadmium stearate (1 g for 100 g of polymer) and barium stearate (1.2 g for 100 g polymer), called Cd-Ba stabilizer. The temperatures displayed by the walls of the mixer are generally 200° or 205° C. Table I contains the main characteristics of the cross-linking of polyvinyl chloride in dynamic phase, coating time Ti before the start of a significant cross-linking, the total mixing time Tm, the variation in the moment M and the average cross-linking speed $S_C$.

TABLE I

| | | | Cross-linking of polyvinyl chloride in dynamic phase by tin organometallic alcoholates | | | | | |
|---|---|---|---|---|---|---|---|---|
| | | | Cross-linking System | | | | | |
| Example No | T (°C.) | Stabilizer | Nature | Concentration (mole · Kg$^{-1}$) | $T_m$ (mn) | $T_i$ (mn) | ΔM (N.m) | $S_C$ (N.m mn$^{-1}$) |
| 1 | 205 | tin | ethanedixoy-1,2-dibutyltin | 0.136 | 5 | 3.7 | 3 | 2.4 |

TABLE I-continued

Cross-linking of polyvinyl chloride in dynamic phase by tin organometallic alcoholates

| Example No | T (°C.) | Stabilizer | Cross-linking System Nature | Concentration (mole · Kg$^{-1}$) | $T_m$ (mn) | $T_i$ (mn) | $\Delta M$ (N.m) | $S_C$ (N.m mn$^{-1}$) |
|---|---|---|---|---|---|---|---|---|
| 2 | 205 | tin | propanedixoy-1,2-dibutyltin | 0.136 | 8.5 | 4 | 2.8 | 0.62 |
| 3 | 200 | tin | ethyleneglycol dibutyltin oxide | 0.0125 0.05 | 5.5 | 3.5 | 2.2 | 1.1 |
| 4 | 200 | tin | 1-1-1-trimethylol propane dibutyltin oxide | 0.39 0.28 | 8.5 | 7 | 3 | 2.0 |
| 5 | 205 | tin | dichlorodibutyltin calcium ethylene glycolate | 0.28 0.68 | 4 | 3.5 | 4.6 | 3.0 |
| 6 | 205 | tin | ethylene carbonate dibutyltin oxide | 0.27 0.27 | 5 | 3 | 28 | 14 |
| 7 | 200 | Cd—Ba | ethylene glycol diphenyllead oxide | 0.185 0.185 | 14 | 6 | 3.9 | 0.49 |
| 8 | 205 | tin | trimethylolpropane triacetate dibutyltin oxide | 0.27 0.27 | 12 | 8 | 3 | 0.75 |

For all the examples described in this table, the percentage of insoluble polymer in the tetrahydrofuran is greater than 50% at ambient temperature.

It is interesting to note the high cross-linking speed for Example 6 with the ethylene carbonate - dibutyltin oxide cross-linking system leading to the formation in situ of ethanedioxy-1,2-dibutyltin with release of $CO_2$ which can be used to make cross-linked foams, for example and in a nonlimitative way, in a coating process.

Table II sets out the examples of cross-linking of polyvinyl chloride by tin organometallic alcoholates in static phase.

For all these examples, the polymer is made into a gel using a RHEOMIX 600 internal mixer fitted to a Haake plastograph at 200° C., the rotational speed being 50 revs per minute. After thickening, the thickened polymer with its cross-linking system is transferred into a mould placed between the plates of a press pre-heated to 205° C. The stabilizer used for these tests is as previously isooctyl dioctyltin dithioglycolate. A pressure of 10 bars is maintained on the material during the test. The effectiveness of the cross-linking system is then evaluated by determination of the swelling rate in tetrahydrofuran (THF) after 48 hours of immersion at ambient temperature and/or by the proportion by weight of insoluble polymer in this solvent at ambient temperature.

Table III shows that it is possible to cross-link chlorinated polyethylene (for example 36% chlorine content) by ethanedioxy-1,2-dibutyltin just as polyvinyl chloride. The test in this table was carried out in a RHEOMIX 600 internal mixer in the presence of isooctyl dioctyltin dithioglycolate as thermal stabilizer at a rate of 2 g per 100 g of polymer, the temperature of the mixer walls being 205° C.

Tables IV, V and VI set out the examples showing that the copolymers of vinyl chloride and vinyl acetate are cross-linkable according to the invention by organometallic alcoholates of tin, lead, antimony and bismuth generated in situ by interaction of an organometallic oxide of these metals with the ester functions of vinyl polyacetate sequences. For these tests, the stabilizer used is, as previously, isooctyl dioctyltin dithioglycolate at a rate of 2 g per 100 g of copolymer.

For the tests (tables IV and V), in dynamic conditions, the walls of the RHEOMIX 600 mixer are maintained at 200° C. and the rotational speed is 50 revs per minute. For the tests of cross-linking in static phase under a press (table VI), the temperature of the plates is 205° C. and the polymer with its cross-linking system is maintained under a pressure—crosslinking system mixture being carried out beforehand using a RHEOMIX 600 internal mixer at 200° C. The vinyl chloride—vinyl acetate copolymer contains 11% by weight of a vinyl acetate unit.

TABLE II

Cross-linking of polyvinyl chloride in static phase at 205° C. by tin organometallic alcoholates

| Example No | ethanedioxy-1,2-dibutyltin | calcium ehtylene glycolate | Sn/Ca | Dibutyltin oxide | 1-1-1-tri-methylol propane | 1,1,-trimethyl-olpropane triacetae | Time (mn) | Insoluble proportion THF (%) | Swell rate (%) |
|---|---|---|---|---|---|---|---|---|---|
| 9 | 0.274 | 0 | — | — | — | — | 3 | 73 | — |
| 10 | 0.171 | 0.50 | 0.34 | — | — | — | 4 | >95 | 21.8 |
| 11 | 0.171 | 0.50 | 0.34 | — | — | — | 5 | >95 | 9.0 |
| 12 | 0.274 | 0.30 | 0.91 | — | — | — | 4 | >95 | 12.3 |
| 13 | 0.274 | 0.30 | 0.91 | — | — | — | 5 | >95 | 8.2 |
| 14 | 0.274 | 0.40 | 0.68 | — | — | — | 4 | >95 | 8.4 |
| 15 | 0.274 | 0.40 | 0.68 | — | — | — | 5 | >95 | 7.1 |
| 16 | — | — | — | 0.28 | 0.39 | — | 5 | 85 | — |
| 17 | — | — | — | 0.27 | — | 0.27 | 5 | 79 | — |

TABLE III

Cross-linking of the chlorinated polyethylene by tin organometallic alcoholates in dynamic phase

| Example | Ethanedioxy-1,2-dibutyltin mole · kg$^{-1}$ | $T_m$ (mn) | $T_i$ (mn) | $\Delta M$ (N.m) | $S_C$ (Nm. min$^{-1}$) |
|---|---|---|---|---|---|
| 18 | 0.274 | 7 | 4 | 5.5 | 1.8 |

TABLE IV

Cross-linking of vinyl chloride and vinyl acetate copolymers in dynamic phase by organometallic alcoholates of tin, lead and bismuth

| | Cross-linking system mole Kg$^{-1}$ | | | | | | | | | | |
|---|---|---|---|---|---|---|---|---|---|---|---|
| | Tin oxide: | | | | | Diphenyl- lead oxide | Triphenyl bismuth oxide | Acetate (%) | $T_m$ (mn) | $T_i$ (mn) | $\Delta M$ (N.m) | $S_C$ (Nm. mn$^{-1}$) |
| Example | dioctyl | dibutyl | diphenyl | monobutyl | tributyl | | | | | | | |
| 19 | 0.111 | — | — | — | — | — | — | 4 | 12 | 5.5 | 8 | 1.2 |
| 20 | 0.081 | — | — | — | — | — | — | 11 | 10 | 5.5 | 20 | 4.4 |
| 21 | — | 0.081 | — | — | — | — | — | 11 | 6 | 2.5 | 22 | 6.3 |
| 22 | — | — | 0.081 | — | — | — | — | 11 | 9 | 4.5 | 12 | 2.7 |
| 23 | — | — | — | 0.081 | — | — | — | 11 | 8 | 4 | 20 | 5.0 |
| 24 | — | — | — | 0.135 | — | — | — | 11 | 8 | 4 | 31 | 7.8 |
| 25 | — | — | — | — | 0.067 | — | — | 11 | 8.5 | 4.5 | 9.4 | 2.3 |
| 26 | — | — | — | — | — | 0.081 | — | 11 | 4 | 3 | 1.2 | 1.2 |
| 27 | — | — | — | — | — | — | 0.081 | 11 | 2.8 | 1.4 | 2.8 | 2.0 |

TABLE V

Cross-linking of vinyl chloride and vinyl acetate copolymers in dynamic phase with tin organometallic alcoholates

| | Cross-linking system: mole kg$^{-1}$ | | | | | | | |
|---|---|---|---|---|---|---|---|---|
| Example | Dioctyltin oxide | Dimethyl phthalate | Dimethyl sebacate | Acetate (%) | $T_m$ (mn) | $T_i$ (mn) | $\Delta M$ (N.m) | $S_C$ (N.m. mn$^{-1}$) |
| 28 | 0.083 | 0.0524 | — | 4 | 12.5 | 4.5 | 11 | 1.4 |
| 29 | 0.083 | — | 0.0524 | 4 | 13.5 | 8 | 18 | 3.2 |
| 30 | 0.083 | 0.0524 | — | 11 | 7.5 | 2.5 | 30 | 6.0 |
| 31 | 0.083 | — | 0.0524 | 11 | 11.5 | 3.5 | 29 | 3.6 |
| 32 | 0.083 | 0.515 | — | 11 | 7.5 | 2.5 | 30 | 6 |

TABLE VI

Cross-linking of copolymers of vinyl chloride and vinyl acetate in static phase with tin organometallic alcoholates

| | Cross-linking system: mole kg$^{-1}$ | | | | | |
|---|---|---|---|---|---|---|
| | Tin oxide | | | | molar ratio acetate/tin | Swelling rate in THF after 48 hours (%) |
| Example | Dimethyl | Dibutyl | Diphenyl | Triphenyl | | |
| 33 | 0.403 | — | — | — | 3.2 | 19 |
| 34 | 0.64 | — | — | — | 2 | 25 |
| 35 | — | 0.403 | — | — | 3.2 | 21 |
| 36 | — | 0.64 | — | — | 2.0 | 29 |
| 37 | — | — | 0.403 | — | 3.2 | 23 |
| 38 | — | — | — | 0.241 | 5.3 | 9.5 |

For examples 19 and 28 the proportion of insoluble polymer in the tetrahydrofuran is of the order of 100%. It is greater than 50% in the other cases. For the tests in static conditions (table VI), the proportions of insoluble polymers in the THF after heating for 5 minutes at 205° C. are greater than 95%. The results reported in this table IV also show that it is possible to control the cross-linking density by adjusting the concentration of tin organometallic oxide.

Table VII shows that it is also possible to cross-link copolymers of ethylene and vinyl acetate by tin organometallic alcoholates according to the present invention, the alcoholate being synthesized beforehand or generated in situ by interaction of the ester functions with a tin oxide. For these tests, the temperature of the mixer is 205° C. and the rotational speed is 50 revs per minute.

For all these examples, the proportions of insoluble polymer in the toluene at 110° C. are greater than 50% and are close to 100% for examples 39 and 40.

Table VIII shows that it is possible to cross-link ethylene - acrylic ester copolymers such as ethyl acrylate with tin organometallic alcoholates of cyclic (stannooxacycloalkane) type according to the present invention. For these examples, the ethylene - ethyl acrylate copolymer contains 9% by weight of this monomer, the temperature of the mixer is 200° C. and the rotational speed is 50 revolutions per minute. For these examples, the proportions of insoluble polymer in the toluene at 110° C. are less than 50%.

Table IX shows that the polyamides can also be cross-linked with tin organometallic alcoholates of dialkoxy dialkyl tin type according to the present invention. For this example, the 12 polyamide is molten at 200° C. in the RHEOMIX 600 mixer and the alcoholate is added after 10 minutes of mixing. After adding the alcoholate, an increase in moment of more than 100% in less than one minute is observed, which is characteristic of cross-linking.

Table X shows that polyethylene terephthalate can be cross-linked with tin organometallic alcoholates according to the present invention. In this example, the tin alcoholate is synthesized in situ by the interaction of dibutyltin oxide with pentaerythritol tetraacetate. For this test, the polymer, the tin oxide and the pentaerythritol tetraacetate are heated to 260° C. for 20 minutes in static conditions in an oven.

Table XI shows that the polycarbonate can be cross-linked with tin organometallic alcoholates according to the present invention. In this example, the alcoholate is synthesized in situ as for the previous example, by the interaction of dibutyltin oxide with pentaerythritol tetraacetate and cross-linking is carried out in dynamic phase in the RHEOMIX 600 internal mixer at 250° C. After 15 minutes of mixing at this temperature, the proportion of insoluble polymer in the xylene is 89%.

Table XII shows that the mixtures of polyvinyl chloride-vinyl acetate and polyvinyl chloride - acrylic ester copolymer are co-cross-linkable with tin organometallic alcoholates, the alcoholate being generated in situ in these examples by interaction between the tin organometallic oxide and the acetate functions. For these tests in dynamic phase, the thermal stabilizer is isooctyl dibutyltin dithioglycolate at a rate of 2 g per 100 g of copolymer mixture, the temperature of RHEOMIX 600 mixer is 205° C. and the rotational speed is 50 revolutions per minute. For all these tests, the proportion of insoluble polymer in the tetrahydrofuran at ambient temperature is greater than 50%.

For all the examples described in table XII, the polyvinyl chloride - vinyl acetate copolymer contains 11% by weight of this monomer.

The examples described in this table show, finally, the novelty of the process according to the present invention for cross-linking polyvinyl chloride by mixing two of these copolymers and thus avoiding the problems of incompatibility often encountered in polymer mixtures or in mixtures of polymers and additives.

Table XIII shows that the cross-linking of the mixtures previously described in table XII with tin organometallic alcoholates can be achieved in static conditions at 205° C. between the plates of a heating press, maintaining a pressure of 10 bars on the polymer mixture. After 5 minutes at this temperature, the mixtures are co-cross-linked and the proportions of insoluble polymer in the THF after 48 hours of immersion are greater than 95%. For these examples, the PVC-vinyl acetate copolymer contains, as previously, 11% by weight of a vinyl acetate unit. Just as previously, the alcoholate is synthesized in situ by interaction of the acetate groups with dibutyltin oxide at a rate of 0.161 mole per kg of copolymer mixture. These examples confirm the novelty of the process according to the invention applied to polyvinyl chloride copolymers in order to cross-link this polymer.

Table XIV shows that the mixtures of the polyvinyl chloride - vinyl acetate copolymer with copolymers of methacrylic and acrylic esters can be co-cross-linked with tin organometallic alcoholates according to the invention. For these examples, the PVC - vinyl acetate copolymer contains 11% by weight of vinyl acetate unit, the stabilizer used is the tin stabilizer previously used for the examples of tables XII and XIII at the same concentration. The temperature of the mixer is 205° C. and the rotational speed is 50 revolutions per minute. For these two examples, the proportion of insoluble copolymer in the THF at ambient temperature is greater than 50%.

Table XV shows that it is possible to co-cross-link polyvinyl chloride mixtures of polyvinyl acetate or vinyl acetate - ethylene copolymers with tin organometallic alcoholates according to the present invention. In these examples, the tin alcoholate is synthesized in situ by interaction of the organometallic oxide with vinyl acetate groups. The stabilizer used is isooctyl dioctyltin dithioglycolate at a rate of 2 g per 100 g of polymer, the temperature of the mixer is maintained at 205° C. and the rotational speed is 50 revolutions per minute. For these examples, the proportion of insoluble polymer in the tetrahydrofuran at ambient temperature is greater than 50%.

Table XVI shows that the polyvinyl chloride - polyvinyl acetate or polyvinyl chloride - vinyl chloride vinyl acetate copolymer mixtures can be co-cross-linked in static phase with tin organometallic alcoholates according to the present invention. For these tests, the temperature is 205° C. and the pressure exerted on the mixture placed in the mould between the plates of the heating press is 10 bars. The curing time was fixed at 5 minutes.

Table XVII sets out examples showing that it is possible to co-cross-link grafted copolymer mixtures of polypropylene with vinyl acetate and acrylic esters as well as mixtures of grafted polypropylene with acrylic esters and copolymers of ethylene and vinyl acetate with tin organometallic alcoholates according to the present invention. For these examples, the grafted copolymers of polypropylene are prepared by radical-like grafting of the corresponding vinyl monomers initiated from peroxides grafted onto polypropylene over a fluid bed according to the process described in the French Patent No. 81 22802.

For all these examples, the mixtures of grafted copolymers of polypropylene with vinyl acetate and butyl acrylate and the mixtures of grafted copolymers of polypropylene with butyl acrylate and copolymers of ethylene and vinyl acetate are carried out using a RHEOMIX 600 mixer at 200° C. by mixing for 20 minutes with a rotational speed of 50 revolutions per minute. The mixtures thus produced are co-cross-linked at 205° C. for 15 minutes in a mould placed between the plates of a heating press.

The proportions of insoluble polymer in the xylene at 140° C. are greater than 50%. These examples also show the novelty of the present invention as a polypropylene crosslinking process.

Table XVIII shows that it is possible to co-cross-link polyamide - ethyl and vinyl acetate copolymer mixtures with tin organometallic alcoholates according to the present invention. In this example, the 12 polyamide is molten at 200° C. in the RHEOMIX 600 mixer, the rotational speed being 50 revolutions per minute The dimethoxy dibutyltin is then added and an increase in the moment is instantly observed. This is continued for 34 minutes before reaching a steady value. This increase in moment is the indication of the cross-linking of the mixture.

TABLE VII

Cross-linking of ethylene - vinyl acetate copolymers 38 in dynamic phase with tin organometallic alcoholates

| Example | Acetate (%) | Ethanedioxy-1,2-dibutyltin | Dimethoxy-dibutyltin | Tin oxide dibutyl | Tin oxide dioctyl | $T_m$ (mn) | $T_i$ (mn) | ΔM (N.m) | $S_C$ (N.m. mn$^{-1}$) |
|---|---|---|---|---|---|---|---|---|---|
| | | Cross-linking mole · kg$^{-1}$ | | | | | | | |
| 39 | 26 | 0.160 | — | — | — | 19 | 5.5 | 20 | 1.48 |
| 40 | 16 | — | 0.160 | — | , | 4 | 0 | 40 | 10.0 |
| 41 | 26 | — | — | 0.28 | — | 20 | 8 | 22 | 1.4 |
| 42 | 26 | — | — | — | 0.28 | 15 | 7.5 | 10 | 1.3 |

TABLE VIII

Cross-linking of ethylene - ethyl acrylate copolymers in dynamic phase with tin organometallic alcoholates.

| Example | Cross-linking mole · kg$^{-1}$ ethanedioxy-1,2-dialkyltin dibutyl | Cross-linking mole · kg$^{-1}$ ethanedioxy-1,2-dialkyltin dioctyl | $T_m$ (mn) | $T_i$ (mn) | ΔM (N.m) | $S_C$ (N.m. mn$^{-1}$) |
|---|---|---|---|---|---|---|
| 43 | 0.16 | — | 13.5 | 6.5 | 5.6 | 0.8 |
| 44 | — | 0.16 | 13.5 | 5.5 | 6.6 | 0.8 |

TABLE IX

Cross-linking of 12 polyamide with tin organometallic alcoholates

| Example | Cross-linking system mole · kg$^{-1}$ Dimethoxy-dibutyltin | Duration of cross-linking (mn) | ΔM (N.m) | $S_C$ (N.m.mn$^{-1}$) |
|---|---|---|---|---|
| 45 | 0.34 | 0.5 | 5.6 | 11.2 |

TABLE X

Cross-linking of polyethylene terephthalate in static phase with tin organometallic alcoholates

| Example | Cross-linking system Dibutyltin oxide mole · Kg$^{-1}$ | Cross-linking system pentaerythrol tetraacetate mole · Kg$^{-1}$ | insoluble proportion in the 50/50 chloroform tetrachloroethane mixture (%) |
|---|---|---|---|
| 46 | 0.251 | 0.180 | 50 |

TABLE XI

Cross-linking of the polycarbonate in dynamic phase with tin organometallic alcoholates

| Example | Cross-linking system Dibutyltin oxide mole · Kg$^{-1}$ | Cross-linking system pentaerythrol tetraacetate mole · Kg$^{-1}$ | Mixing time (mn) | Insoluble proportion in xylene (%) |
|---|---|---|---|---|
| 47 | 0.251 | 0.255 | 15 | 89 |

TABLE XII

Co-cross-linking of mixtures of copolymers of vinyl chloride and vinyl acetate and acrylic esters

| Example | Nature and composition of PVC-acrylic ester copolymer | Composition of mixture of PVC acetate—PVC acrylic (%) | Composition of mixture of PVC acetate—PVC acrylic ester (%) | dibutyltin oxide mole · Kg$^{-1}$ | dibutyltin oxide | $T_m$ (mn) | $T_i$ (mn) | Δ M (N · m) | $S_C$ (N · m · mn$^{-1}$) |
|---|---|---|---|---|---|---|---|---|---|
| 48 | ethyl-2-hexyl acrylate 23% | 67.5 | 32.5 | — | 0.083 | 12.5 | 6.5 | 26 | 4.4 |
| 49 | methyl acrylate 10% | 65 | 35 | — | 0.083 | 8.5 | 4 | 18.6 | 1.6 |
| 50 | methyl acrylate 10% | 65 | 35 | 0.083 | — | 8.5 | 4 | 7.6 | 2.2 |

TABLE XIII

Cross-linking of mixtures of copolymers of vinyl chloride and vinyl acetate and vinyl chloride and acrylic esters in static condition with tin organometallic alcoholates

| Example | Nature and composition of PVC-acrylic ester copolymer | Composition of mixture of PVC acetate—PVC acrylic ester (%) | Composition of mixture of PVC acetate—PVC acrylic ester (%) | Acetate/acrylate ratio | Swelling rate in THF (%) |
|---|---|---|---|---|---|
| 51 | methyl acrylate 10% | 50 | 50 | 1.1 | 22 |
| 52 | methyl acrylate 10% | 60 | 40 | 1.67 | 12.4 |
| 53 | ethyl-2-hexyl acrylate 23% | 67.5 | 32.5 | 2.15 | 25 |

TABLE XV

Co-cross-linking of mixtures of copolymers of vinyl chloride and vinyl acetate and copolymers of acrylic and methacrylic ester with tin organometallic alcoholates

| Example | Nature and composition of acrylic and methy-acrylic ester copolymer | Composition of mixture of PVC acetate—PVC acrylic and methacrylate ester (%) | Composition of mixture of PVC acetate—PVC acrylic and methacrylate ester (%) | dibutyltin oxide mole · Kg$^{-1}$ | $T_m$ (mn) | $T_i$ (mn) | Δ M (N · m) | $S_C$ (N · m · mn$^{-1}$) |
|---|---|---|---|---|---|---|---|---|
| 48 | methyl acrylate 60% methyl methacrylate 40% | 89 | 11 | 0.086 | 9 | 5 | 24 | 4 |
| 55 | methyl acrylate 60% methyl methacrylate 40% | 87.3 | 12.7 | 0.088 | 9.5 | 5.5 | 16.8 | 4.2 |

TABLE XV

Co-cross-linking of polyvinyl chloride—polyvinyl acetate or vinyl acetate copolymer with tin organometallic alcoholates

| Example | Composition of mixture PVC (%) | Composition of mixture polyvinyl acetate (%) | ethylene—vinyl acetate copolymer 45% by weight (%) | tin oxide: dibutyl | tin oxide: triphenyl | Cross-linking system mole · Kg$^{-1}$ T$_m$ (mn) | T$_i$ (mn) | ΔM (N · m) | S$_C$ (N · m · mn$^{-1}$) |
|---|---|---|---|---|---|---|---|---|---|
| 56 | 70 | 30 | — | 0.40 | — | 11 | 5 | 38 | 6.3 |
| 57 | 80 | — | 20 | — | 0.083 | 6.5 | 4.5 | 4.8 | 2.4 |

TABLE XVI

Co-cross-linking of mixtures of polyvinyl chloride—polyvinyl acetate or polyvinyl chloride—vinyl chloride—vinyl acetate copolymer in static condition with tin organometallic alcoholates

| Example | PVC | polyvinyl acetate | PVC≤vinyl acetate copolymer 11% | tin oxide: dibutyl | tin oxide: triphenyl | Insoluble proportion in THF (%) |
|---|---|---|---|---|---|---|
| 58 | 70 | 30 | — | 0.273 | — | 77 |
| 579 850 | — | 50 | . | 0.251 | 78 | |

TABLE XVII

Co-cross-linking of mixtures of grafted polypropylene copolymers with acrylic esters and vinyl acetate as well as mixtures of grafted polypropylene copolymers with acrylic esters and ethylene—vinyl acetate copolymers or acrylic polyesters with tin organometallic alcoholates

| Example | Nature and composition by weight of polypropylene copolymers | polypropylene copolymer (%) | ethylene—vinyl acetate copolymer at 16.7% | dibutyltin oxide | ethanedioxy-1,2-dibutyltin | Acetate/Acrylate | Insoluble proportion in xylene at 140° |
|---|---|---|---|---|---|---|---|
| 60 | polypropylene—vinyl acetate 15.6% | vinyl | | 0.33 | — | 1.74 | 79 |
| | polypropylene—butyl acetate 16.5% | 50 | | | | | |
| 61 | polypropylene—butyl acetate 18.8% | 91 | 9 | 0.30 | — | 0.58 | 70 |
| 62 | polypropylene—butyl acetate at 8.5% | 91 | 9 | 0.30 | — | 0.24 | 64 |
| 62 | polypropylene—butyl acetate at 8.5% | 91 | 9 | | 0.258 | | 51 |

TABLE XVIII

Co-cross-linking of polyamide—ethylene and vinyl acetate coploymer mixtures with tin organometallic alcoholates in dynamic phase

| Example | 12 polyamide | ethylene—acetate copolymer at 16% | dimethoxydibutyltin mole · Kg$^{-1}$ | T$_m$ (mn) | Δ M (N · m) | S$_C$ (N · m · mn$^{-1}$) |
|---|---|---|---|---|---|---|
| 64 | 21 | 79 | 0.96 | 34 | 12.46 | 0.37 |

We claim:

1. Cross-linking process of polymers or copolymers ((co)polymers) containing chloro, ester, NH or carbonate groups, characterized in that a derivative of organometallic alcoholate type of formula (R)$_n$Me(O)$_{m-n}$R', in which:

Me represents an atom of tin, lead, bismuth or antimony, R represents a linear or branched alkyl radical containing 1 to 8 carbon atoms, a cycloalkyl radical containing 3 to 12 carbon atoms, an optionally substituted aryl radical containing 6 to 12 carbon atoms, an optionally substituted aralkyl radical containing 7 to 14 carbon atoms or a cycloalkylalkyl radical containing 4 to 8 carbon atoms, R' represents a linear or branched alkyl radical containing 1 to 20 carbon atoms, an aralkyl radical containing 7 to 14 carbon atoms, a cycloalkyl radical containing 3 to 12 carbon atoms, an cycloalkyl- alkyl radical containing 4 to 8 carbon atoms, an aryl- cycloalkyl radical containing 10 to 20 carbon atoms or a polymer chain, the said R' radical being substituted with a moiety which is not capable of affecting a crosslinking reaction, m is equal to 4 and n is equal to 1, 2 or 3, when Me represents tin or lead, and m is equal to 5 and n is equal to 1, 2, 3 or 4, when Me represents bismuth or antimony, is reacted with the said (co)polymer between 100° and 300° C. and in the absence of a solvent.

2. Process according to claim 1, characterized in that a chlorinated (co)polymer is used.

3. Process according to claim 1, characterized in that a (co)polymer of acrylic or methacrylic ester is used.

4. Process according to claim 1, characterized in that a (co)polymer of vinyl acetate is used.

5. Process according to claim 1, characterized in that a (co)polymer containing NH functions is used.

6. Process according to claim 1, characterized in that a polycarbonate is used.

7. Process according to claim 1, characterized in that a polyester is used.

8. Process according to claim 1, characterized in that a (co)polymer of polyvinyl chloride is used.

9. Process according to claim 1, characterized in that a ethylene - vinyl acetate copolymer is used.

10. Process according to claim 1, characterized in that a chlorinated or grafted vinyl acetate and/or acrylic or methacrylic ester polypropylene is used.

11. Process according to claim 1, characterized in that a polyamide is used.

12. Process according to claim 1, characterized in that the derivative of organometallic type of formula $(R_n)Me(O)M_{-n}R'$ is synthesized in situ.

13. Cross-lined compositions, characterized in that they contain a (co)polymer containing chloro, ester, NH or carbonate groups, and a derivative of organometallic alcoholate type of formula $(R)_nMe(O)_{m-n}R'$, in which:

Me represents an atom of tin, lead, bismuth or antimony, R represents a linear or branched alkyl radical containing 1 to 8 carbon atoms, a cycloalkyl radical containing 3 to 12 carbon atoms, an optionally substituted aryl radical containing 6 to 14 carbon atoms, an optionally substituted aralkyl radical containing 7 to 14 carbon atoms or a cycloalkylalkyl radical containing 4 to 8 carbon atoms, R' represents a linear or branched alkyl radical containing 1 to 20 carbon atoms, an aralkyl radical containing 8 to 15 carbon atoms, a cycloalkyl radical containing 3 to 12 carbon atoms, an arylcycloalkyl radical containing 10 to 20 carbon atoms or a polymer chain substituted with a moiety which is not capable of affecting a crosslinking reaction, m is equal to 4 and n is equal to 1, 2 or 3, when Me represents tin or lead, and m is equal to 5 and n is equal to 1, 2, 3 or 4, when Me represents bismuth or antimony.

14. Compositions according to claim 13, characterized in that they contain a chlorinated (co)polymer.

15. Compositions according to claim 13, characterized in that they contain a (co)polymer of acrylic or methacrylic ester.

16. Compositions according to claim 13, characterized in that they contain a (co)polymer of vinyl acetate.

17. Compositions according to claim 13, characterized in that they contain a (co)polymer containing NH functions.

18. Compositions according to claim 13, characterized in that they contain a polycarbonate.

19. Compositions according to claim 13, characterized in that they contain a polyester.

20. Compositions according to claim 13, characterized in that they contain a (co)polymer of polyvinyl chloride.

21. Compositions according to claim 13, characterized in that they contain an ethylene - vinyl acetate copolymer.

22. Compositions according to claim 13, characterized in that they contain a chlorinated or grafted vinyl acetate and/or acrylic or methacrylic ester polypropylene.

23. Compositions according to claim 13, characterized in that they contain a polyamide.

24. Compositions according to claim 16, characterized in that they contain an organometallic oxide of tin, lead, antimony or bismuth.

25. Mixtures, alloys or mixed compositions of (co)polymers according to claim 1.

26. Shaped objects, characterized in that they are prepared from products obtained by implementing the process according to claim 1.

27. Shaped objects, characterized in that they are constituted by a composition according to claim 13.

* * * * *